United States Patent [19]

Paulman

[11] Patent Number: 5,544,698
[45] Date of Patent: Aug. 13, 1996

[54] DIFFERENTIAL COATINGS FOR MICROEXTRUDED TUBES USED IN PARALLEL FLOW HEAT EXCHANGERS

[75] Inventor: Roger Paulman, Barrington, Ill.

[73] Assignee: Peerless of America, Incorporated, Chicago, Ill.

[21] Appl. No.: 220,159

[22] Filed: Mar. 30, 1994

[51] Int. Cl.⁶ .................................................. F28F 19/02
[52] U.S. Cl. ...................... 165/133; 165/134.1; 228/208; 228/226
[58] Field of Search ........................ 228/208, 226, 228/262.51, 183; 165/133, 134.1, 180

[56] References Cited

U.S. PATENT DOCUMENTS

| | | | |
|---|---|---|---|
| 4,901,908 | 2/1990 | Negura et al. | 228/183 |
| 5,054,549 | 10/1991 | Nakaguro | 165/133 |

FOREIGN PATENT DOCUMENTS

| | | | |
|---|---|---|---|
| 59-85364 | 5/1984 | Japan | 228/226 |
| 2-46968 | 2/1990 | Japan | 228/262.51 |
| 3-77776 | 4/1991 | Japan | 228/262.51 |
| 3-133569 | 6/1991 | Japan | 228/262.51 |

*Primary Examiner*—Allen J. Flanigan
*Attorney, Agent, or Firm*—Emrich & Dithmar

[57] ABSTRACT

Microextruded tubes each having two side surfaces, front and trailing edge surfaces and two ends are provided for insertion into aligned slots in headers to complete a heat exchanger assembly. The tubes each include a first coating composition containing an adhesive binder vehicle, flux material and brazing alloy deposited on the side surfaces adjacent the ends of the tube. The first coating composition is structurally arranged and applied to engage the aligned slots in the headers upon the insertion of the ends of the tubes into the header. The side surfaces of the microextruded tube include a second surface coating containing an adhesive binder vehicle, flux material, zinc and silicon extending the length of side tube between the deposited first coatings. The front and trailing edge surfaces of the tube include a third surface coating composition containing adhesive binder vehicle, flux material and zinc. A method of manufacturing parallel flow-type heat exchangers is disclosed.

21 Claims, 4 Drawing Sheets

DIFFERENTIAL METHOD 5,544,698

DIFFERENTIAL COATINGS FOR MICROEXTRUDED TUBES USED IN PARALLEL FLOW HEAT EXCHANGERS

BACKGROUND OF THE INVENTION

The present invention relates to novel coatings for depositing on microextruded tubes, novel methods of coatings of depositing onto microextruded tubes and novel methods of joining microextruded tubes to headers to complete heat exchanger assemblies.

It is known in the manufacture of heat exchanger assemblies to position an aluminum brazing alloy at the junction between the heat exchanger tubes and the headers so that in the subsequent heat brazing of this junction, a formed fillet or joint is provided between the exchanger tubes and the headers. However, before such aluminum brazing alloys may be utilized to form the fillet, it has been found necessary to either layer the brazing alloy in a sheet form around the junction between the end of the heat exchanger tubes and the headers or to apply the brazing alloy to at least one of the surfaces in a particulate form carried in a liquid vehicle. However, the application of brazing alloys in sheet form is extremely costly, and the application of the brazing alloy in particle form within a liquid vehicle has resulted in uneven and non-uniform coatings.

Additionally, such liquid vehicles for applying the particulate aluminum brazing alloys may become contaminated by the oils which are often utilized in lubricating the heat exchanger tubes to aid in the handling thereof. These oils contaminate the particulate/liquid vehicle mixture thereby resulting in an uneven deposit of such coatings onto the heat exchanger tube and header assembly as well as an improper concentration in the particulate/liquid vehicle mixtures because of the dilution and contamination by the oil into such liquid mixtures.

In all furnace brazing cycles, a flux material is used. The flux material is utilized to remove the oxide ordinarily present on the exposed aluminum metal and other metal surfaces at the location of the joint between the tubes and the headers, as well as to facilitate the flow of molten brazing alloys during the brazing step to fuse and form the fillet or joint between the tube and the header and between tube and fins.

One commercially available flux material is sold under the trademark NOCOLOK, which is a potassium fluoaluminate product available from Alcan International Limited, Montreal, Canada. The NOCOLOK flux material dissolves and otherwise removes the metal oxides on the aluminum surfaces and thereby promotes the flow of brazing alloy about the junction to form the fillet between the heat exchanger tubes and the header and between the tube and fins.

Although the application of aluminum brazing alloys and flux materials has found widespread application in the fillering and joining together of heat exchanger tubes and headers in conventional sized heat exchanger assemblies, when the heat exchanger assemblies include microextruded tubes several problems are encountered when fillering the microextruded tube to the header assembly.

The evolution of the automobile industry has required that significant weight reduction occur with heat exchanger assemblies used in automobile air conditioning units, and has required the reduction in the amount of energy used in such refrigeration units without a reduction in air conditioning or refrigeration capacity. These requirements have dictated a need for more efficient thin walled aluminum tubing which are mounted to header assemblies which will withstand internal pressures developed in the cooling cycle for air conditioning units and refrigeration applications.

The microextruded tube is a thin walled multi-port tube consisting of a generally rectangular shaped tube that is approximately one half to several inches in width and between approximately 0.050 inches a 0.100 inches in thickness. The thickness of the walls of the microextrusion is in the range of approximately 0.010 to 0.020 inches. When microextruded tubes are joined to header assemblies in parallel flow heat type exchangers, several problems are encountered in processing and manufacturing such exchangers using conventional aluminum brazing alloys and flux materials.

For example, it has been found that the application of flux and brazing alloys by using spray and blow-off techniques for depositing the aluminum brazing alloy and the flux material on the junction between the microextrusion tubes and headers in the assembly often times results in an uneven application of the brazing alloy. Also precise deposition of materials is required to insure that there will be sufficient fillet material at the junction of the tube to header to completely fill the gap between the tube and header. In many instances, the deposited aluminum brazing alloy and flux, on the other hand, permits the filler material to enter the inside of the micro-ports of the tube and plug them, thus rendering the tubes useless for heat transfer purposes in the finished heat exchanger assembly.

If the fluxing material also contains silicon or zinc the uneven distribution of the silicon and zinc after brazing causes preferential corrosion sites in the assembly.

If the flux and brazing alloy are deposited in excess, the subsequent brazing furnace operation produces excess chemicals thereby resulting in limited and short cycle life for such brazing furnaces, a costly and expensive problem.

Also, excess oil application to the microextrusion tube for ease of assembly may result in poor adherence of the composition to the tube thereby resulting in an inadequate fillet between the tubes and the header assembly or between tubes and fins.

Additionally, the techniques of spraying zinc, onto the micro-tubes and header assembly results in the wasting of the zinc in the production of the flamed sprayed tubes. The elemental zinc can float free in the air as a result of the flame spraying process which creates a hazardous health condition during the zincating process of applying zinc onto the micro-tubes. Also, any uneven or non-uniform coating of zinc on the tubes causes preferential corrosion sites rendering the finished heat exchanger assembly more prone to corrosion.

Furthermore, lubricating oils are used in many applications to facilitate handling and separation of stacks of the pre-cut microextruded tubes prior to loading into the assembly apparatus to join the micro tubes to the header assembly. This lubricating oil contaminates the flux and final product because such spraying processes becomes saturated with the oil and the entire mix sometimes has to be discarded because the mixture is out of proportional balance.

To overcome the problems associated with joining tubes to headers, it has been suggested to utilize fit-up rods within the headers to control the proper insertion depth of both ends of each micro-tube is equal when the micro-tube is joined to the headers in the heat exchanger assembly. This technique requires the use of special rods inserted into the headers to provide even spacing and expensive header designs. Both techniques are time consuming and expensive.

SUMMARY OF THE INVENTION

It is an object of the present invention to provide an improved fillet between a microextruded tube and header to complete a heat exchanger assembly.

It is a further object of the present invention to provide an improved fillet between a microextruded tube and header for use in parallel flow type heat exchangers.

It is yet another object of the present invention to provide a method of applying a flux material, brazing alloy and adhesive binder vehicle adjacent to the ends of a microextruded tube for brazing of the tube to a header to complete a heat exchanger assembly.

It is yet another object of the present invention to provide an improved method of applying a flux material and brazing alloy adjacent the ends of microextruded tubes to provide the fillet between the microextruded tubes and the header of a heat exchanger assembly which prevents the diffusion into and the contamination of the microextruded tube during assembly.

It is a further object of the present invention to provide differential coatings on various parts of the microextruded tubes with a flux material and/or zinc and/or silicon to provide a substantially uniform galvanic potential throughout the finished heat exchanger assembly.

It is still yet another object of the present invention to provide a method of applying a side coating composition containing a flux material, zinc, and silicon contained in an adhesive binder vehicle to the side surfaces of the microextruded tube which provides adherence of the coating onto the tube side surfaces.

Still a further object of the present invention is the application of a differential coating compositions containing flux material, aluminum brazing alloy and/or zinc and/or silicon and an adhesive binder vehicle which facilitates adherence of the differential coating compositions onto the microextruded tube and header assembly by painting, printing and other application techniques.

A further object of the present invention is to provide a predetermined and controlled coating composition containing flux material, and zinc in an adhesive binder vehicle which may be applied to the front and trailing edges of the micro-tubes.

It is a further object of the present invention is the utilization of various coating layers on the sides of the microextruded tubes to provide an undulating buildup of side surfaces on the microextruded tubes which provides gaps between stacked tubes such that during processing and assembly of the tubes, the coated tubes slide relative to one another in the assembly process thereby eliminating the need for lubricating oil to be used during manufacture of the finished heat exchanger assembly.

Additionally, the utilization of predetermined compositions containing a flux material, brazing alloy and/or zinc and/or silicon in a synthetic adhesive vehicle provides for extended furnace efficiency upon heating and brazing the fillet around the joint between the microextruded tubes and the headers.

The present invention contemplates the attachment of microextruded tubes, in parallel flow-type heat exchangers, to headers to complete the thin walled parallel flow-type heat exchangers which are efficient in design and which withstand the internal pressure developed in the cooling cycles for air conditioning and refrigeration. The microextruded tubes are approximately one half to one inch in width and between 0.010 inches to 0.100 inches in thickness. The tubes are extruded and require attachment to the headers in the parallel flow-type heat exchanger assemblies. The attachment of the microextruded tubes to the headers is accomplished by coating the juncture or joint between the tubes and headers with a composition containing an adhesive binder vehicle, flux material and brazing alloy to provide the fillet for securing the tubes to the headers. The reminder of the side of the tube extending the length of the microextruded tube between the end brazing composition is coated with a coating composition containing flux material, zinc, silicon and a glue or adhesive binder vehicle. The front and trailing edges of each tube are coated with a composition including flux material, zinc and a glue or adhesive binder material. The differential coating compositions may be applied by painting the coatings onto the microextruded tube, by printing and other depositing techniques which uniformly apply the controlled coatings to the elongated tube. All brackets, headers and other assembly parts prior to actual assembly for furnace brazing, are coated where required to braze the other parts of the assembly with the coating compositions in accordance with the present invention.

The front and trailing edges of each of the microextruded tubes are coated with the flux material and zinc contained in an adhesive binder vehicle and are substantially free of silicone or aluminum brazing alloy. This is done because during the brazing process, if silicon is present with the aluminum brazing alloy, the silicon is defused into the tubes thereby weakening the structure's defense against corrosion attack. The front and trailing edges of each of the microtubes where they join the headers are particularly prone to corrosive attacks because of their position physically in the finished parallel flow heat exchanger assembly relative to the impingement by salt spray and to the slowness of drying in the rearward portions between the condenser and the radiator, for example in an automobile application.

Additionally, by utilizing separate and distinct coatings on the microextruded tubes, when the tube ends are inserted into the header slots, the flux and aluminum brazing alloy deposited adjacent to the ends of the tubes results in reduced tendency for the brazing alloy, upon melting, to run into the micro-ports within the tube which cause blockages in the tube. Furthermore, in accordance with the present invention, by utilizing differential coatings adjacent the ends of the microextruded tube and intermediate the sides of the tube, it is possible to predeterminely control the zinc content in the coatings in such areas wherein the tube is merged with the headers as well as where the tube is intersected with the fin structures. The selectivity in the zinc concentration content along the length of the microextruded tube provides for an evenness of galvanic potential throughout the finished heat exchanger assembly.

It is also within the present invention that the differential coatings may be applied by painting, printing and other refined techniques. Importantly, the compositions each contain a glue/adhesive binder vehicle or which may be liquid plastic material which upon application of the components to the microextruded tube and header assembly results in excellent adherence or bonding of the coating onto the tube during curing and handling. The glue or adhesive vehicle must posses the property of evaporating or otherwise not interfering with the coating during the brazing process to permit the brazing alloy to properly fillet and join the microextruded tube to the header.

The present invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the present invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
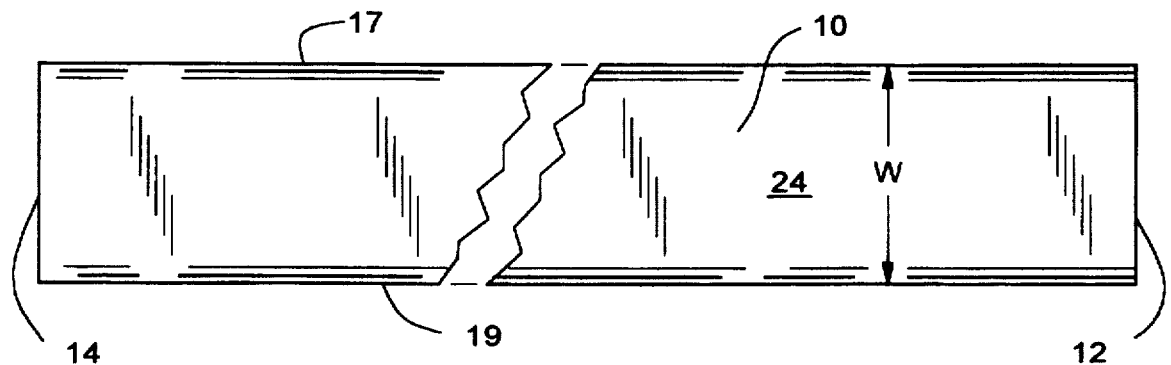
FIG. 1 is a side elevational view of a microextruded tube for use with the present invention.
Figure 2:
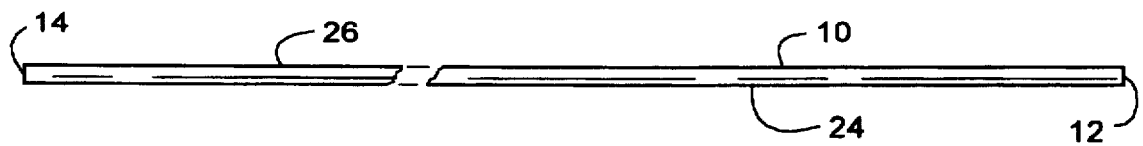
FIG. 2 is a top plan view of the microextruded tube shown in FIG. 1.
Figure 3:
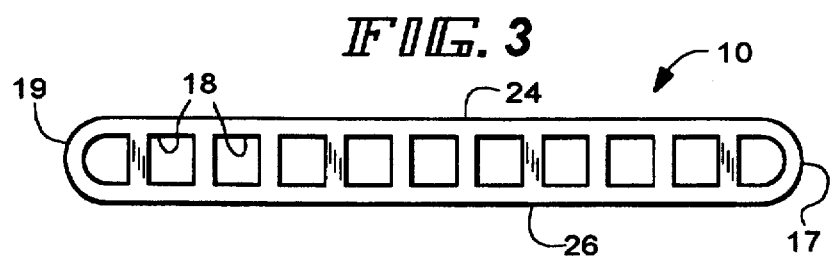
FIG. 3 is an enlarged end view of the microextruded tube shown in FIG. 1.
Figure 4:
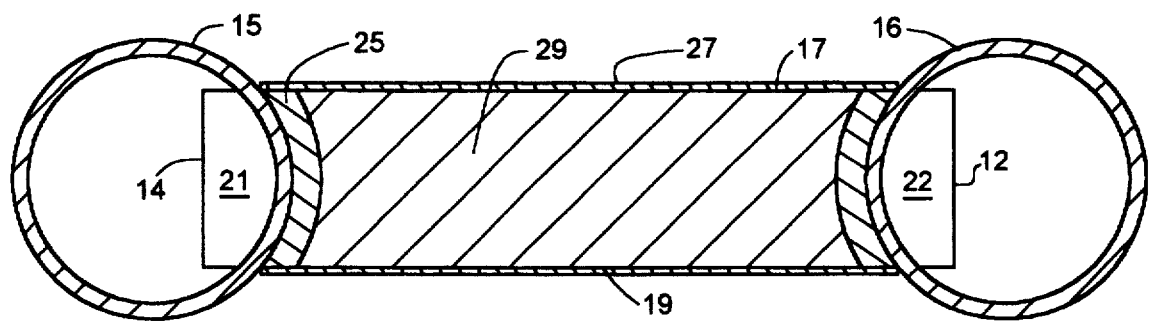
FIG. 4 is a top plan view of a microextruded tube illustrating the differential coatings on the tube, with the tube positioned to the headers during assembly of a parallel flow-type heat exchanger assembly in accordance with the present invention.
Figure 5:
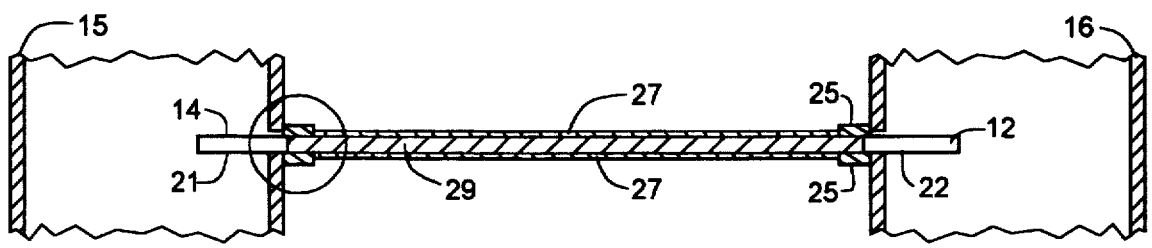
FIG. 5 is a view taken along lines 5—5 of the flow-type heat exchanger assembly in FIG. 1.
Figure 6:
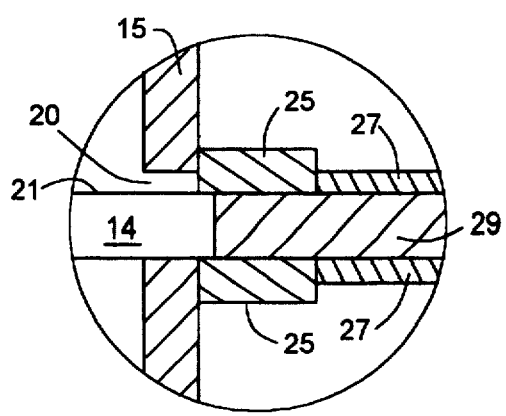
FIG. 6 is an enlarged view of the engagement and positioning of the ends of the microextruded tube into the slots in the header in accordance with the present invention.

Referring now to the drawings, there is illustrated in FIGS. 1 and 2 an elongated microextruded tube 10 which is substantially rectangular in shape and which is approximately one half to one inch in width (W), which may be from a few inches to approximately 30 inches in length, and approximately 0.050 inches to 0.100 inches in thickness. The ends 12 and 14 of the tube 10 are joined to headers 15 and 16, respectively, as shown in FIGS. 4–6, as will hereinafter be described. A plurality of microextruded tubes joined and filleted to the headers provides a parallel flow-type heat exchanger assembly. The microextruded tube 10 includes a plurality of ports or channels 18 therein (FIG. 3) which extend substantially in a parallel spaced relationship between ends 12 and 14 of the tube. Preferably, the microextruded tube and headers are made of aluminum because of the heat transfer characteristics of aluminum.

Figure 8:
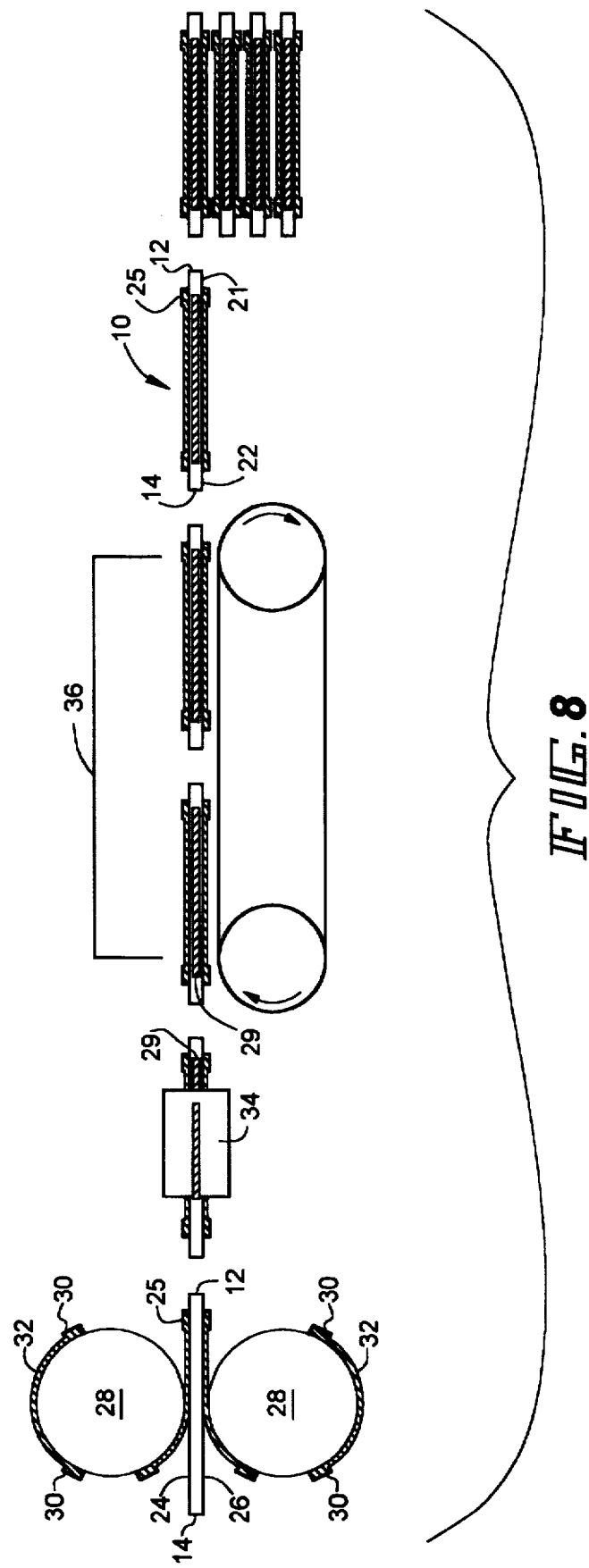
FIG. 8 is a schematic view illustrating an apparatus for applying the differential coatings to the surfaces of the microextruded tubes in accordance with one embodiment of the present invention.

As shown in FIGS. 4–6, a microextruded tube 10 in accordance with the present invention is provided for use in being filleted to the headers 13 and 15 to complete a parallel flow-type heat exchanger assembly. As shown in the drawings, the headers 15 and 16 are, preferably, circular in cross-sectional shape with slots or openings 20 therein dimensioned to receive and to secure the ends 12 and 14 of the tubes to the headers. As shown in FIGS. 4, 5 and 8, to avoid fluxing and the limiting of the flow of filler material at the moment of brazing, no material of any kind will be placed on the substantially half moon or arcuate sections 21 and 22 on the sides 24 and 26 at the ends 12 and 14 of the microextruded tube 10. The half-moon or concave-like configuration structurally corresponds to the slot or openings 20 cut into the tubular header. The elimination of any deposited material on the sides at the ends of the tube provides a area or portion which prevents, and substantially reduces and eliminates the possibly of filament material or brazing alloy entering the capillary sized ports or channels of the microextruded tube thereby blocking them either during the coating operation or during the brazing furnace operation.

Adjacent to each of the material free areas on each end of the tubes, a first coating or buildup layer 25 of a composition containing a glue or adhesive vehicle, a flux material and an aluminum brazing alloy is deposited along the sides of the tube adjacent the header. As shown in FIG. 8, the pre-cut lengths of the microextruded tube 10 are fed between two ink transfer wheels 28 which are sized to and structurally arranged to include a first pad means or portions 30 which deposit and apply a predetermined and controlled first coating composition side surfaces adjacent to the ends of the tube 10 after drying of the coated tubes. The coating thickness of the buildup of this composition material may be as much as 0.01 inches on each side 24 and 26 of the tube 10. The purpose of this buildup is to center and position the ends of the tube between the opening or slots 20 of the headers and into the header, as shown in FIGS. 4–6. The slots or openings 20 in the headers 13 and 15 are structurally arranged to receive the material free areas at the ends of the microextruded tubes, as specifically shown in FIGS. 5 and 6. The buildup of the material on the outside surface of each side of the tube provides an outer dimension which exceeds the dimension of the slots or openings 20 in the header in which the tube is to be inserted, thus causing the inserted tube ends within the header to stop at a desired and controlled location. By eliminating the zinc content in this first coating composition 25 adjacent the junction of the tube and header, a zinc poor fillet after brazing is achieved. This overcomes the prior art heat exchanger structures which utilize zinc rich fillets which often cause such fillets readily to corrode, particularly when used with micro-tubes.

The present concave or crescent shaped buildup layer 25, as shown in the drawings, may be printed on the sides of the tubes using a transfer wheel printing apparatus, which may then be passed through a drying oven 36 and cured until the binder vehicle has been driven out from the deposited mixture and the glue or adhesive material has formed a fast and hard bond between the tube, the fillet material and the flux material. The first pad means or applicators 30 are positioned and spaced on the transfer wheels 28 and engage the tube adjacent or near the tube ends 12 and 14 to predeterminely control and deposit the first coating composition 25 on both sides 24 and 26 of the tube near the ends, as illustrated in FIG. 8. A second pad means or applicator 32 is positioned on the ink-type transfer wheels 28 between the pair of first pad means 30, for a use that will hereinafter be described.

The use of aluminum brazing alloy substantially free of in the area where the header joins the tube provides a stronger and more reinforced fillet joint between the tube and the header after brazing. If the parallel flow-type heat exchanger assembly is utilized in an automobile application, for example, such joints are particularly prone to cracking as a result of vibration of the heat exchanger assembly.

Between the crescent thickened first coatings 25 deposited adjacent each of the ends of the microextruded tube and extending the length of the sides of the tube is a second coating composition 27 containing adhesive binder vehicle, flux material, silicone and zinc, at a concentration than the concentration used in the first coating composition. The use of silicon in the second or side coating 27 permits the manufacturer of the microextruded tubes to attach normal unclad fin stock without the addition of brazing sheet materials thereby substantially reducing fin material costs and wear on the fin cutting blades. The concentration of zinc in the second coating composition 27 creates a uniform protective layer by diffusion over the surface of the tube thereby causing the surface to be integral to the underline aluminum extruded tube which contains the zinc. This second differential material coating 27 is placed in position on the sides of the tube to provide a uniform galvanic potential throughout the assembly.

The second pad means or applicators 32 is positioned on the ink-type transfer wheels 28 and extends between the pair of first pad means. The second pad means engages the sides 24 and 26 of the tube to coat the same with a differential second side coating 27. Also, as shown in FIG. 8, the transfer wheels 28 are schematically depicted as including a plurality of first and second pad applicators 30 having a second pad applicator 32 therebetween. Means, not shown, deposit the first composition onto the first applicators and deposit the second composition onto the second pad applicator for applying to the micro-tubes.

Additionally, the particular coating applied to the sides and/or ends of the tube may be applied using painting, silk screening or other printing/depositing and other techniques to impart a predeterminely controlled and uniform coating to the sides of the microextruded tube 10.

Finally, as shown in FIGS. 4–6 and 8, the front and trailing edges 17 and 19 are coated with a third coating composition 29 containing adhesive or glue binder vehicle, flux material and zinc. This third composition coating 29 is substantially free of silicon and aluminum brazing alloy. The front and trailing edges 17 and 19 of tube 10 are not bonded to any other structure except where the tube ends 12 and 14 are inserted into the slots 20 of the headers 15 and 16. The capillary action of the metal flow of the first coating composition, the brazing alloy, during brazing between the header slots and the ends of the tubes from top to bottom causes a fillet or joint to form on the front and trailing edges of the completed brazed assembly. The zinc content in the third composition coating creates a zinc-rich layer on the front and trailing edges of the tube which combines with the zinc surfaces on the top sides of the tubes to provide an uniform galvanic potential throughout the finished heat exchanger assembly. Because the front and trailing edge coatings is free of silicon, silicon diffusion will be limited in this area, thus insuring the best possible corrosion resistance in the section most prone to it. As shown in FIG. 8, the third composition coating 29 may be readily deposited on the tube edges using a pair of ink transfer wheel 34 (only one is shown) to deposit the differential coating 29 onto the front and trailing edges 17 and 19 of the tube.

After the differential coatings have been applied to the tube 10, the tubes are passed through a drying oven 36 to dry and cure from the various coatings. Drying oven 36 dries and cures the differential coatings to insure a bond of the respective coatings to the tube 10.

The coating compositions may contain solvent to facilitate handling and application of the particular differential coating to the tube. The glue or adhesive binder vehicle need only be a material that permits and facilitates applying the powdered or particulate flux material, brazing alloy and/or zinc and/or silicon onto the tube, and which permits the solvent to evaporate during drying while insuring a bond of the coatings to the tube. One commercially available liquid cement or adhesive, that is both a binder and adhesive and satisfactory in the present invention, is known by the trademark NICROBRAZ, and available from Wall Colmonoy Corporation, Madison Heights, Mich.

After the coating and the drying and curing of the various coating compositions onto the tubes, the tubes may be stacked and shipped to the ultimate manufacturer of the heat exchanger assembly. As a consequence of having built-up several surfaces of differing heights on each tube, as shown in FIG. 8, the coated microextruded tubes will have air or gaps between them which permit sliding relative to one another during the assembly process. Thus, the need for lubricating oil will be eliminated during the manufacturing process.

When the coated and dried tubes are ready for assembly to the headers, the ends of the tubes, substantially free of any type of coating, are inserted into the openings 20 until the wall thickness of the first coating on the sides of the tube engages the header portion surrounding the opening in the header, as shown in FIG. 6. Thus, the wall thickness of the first coating composition facilitates the proper insertion of the tube ends 12 and 14 into the header, as well as provides the brazing metal which forms the fillet to properly join the tubes to the header to complete the parallel flow-type heat exchanger when the assembly is passed through the brazing furnace. Thus, the present invention provides a unique and cost effective method of assembling parallel flow-type heat exchangers.

Figure 7A:
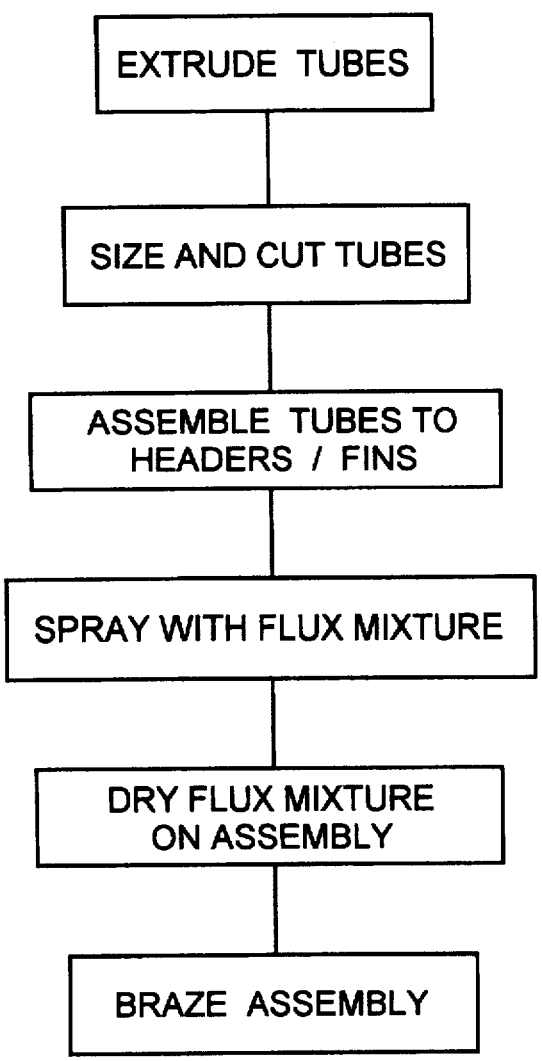
FIG. 7 is a schematic diagram with blocks presented to indicate the various steps of the present invention as compared with various steps in accordance with the prior art.
Figure 7B:
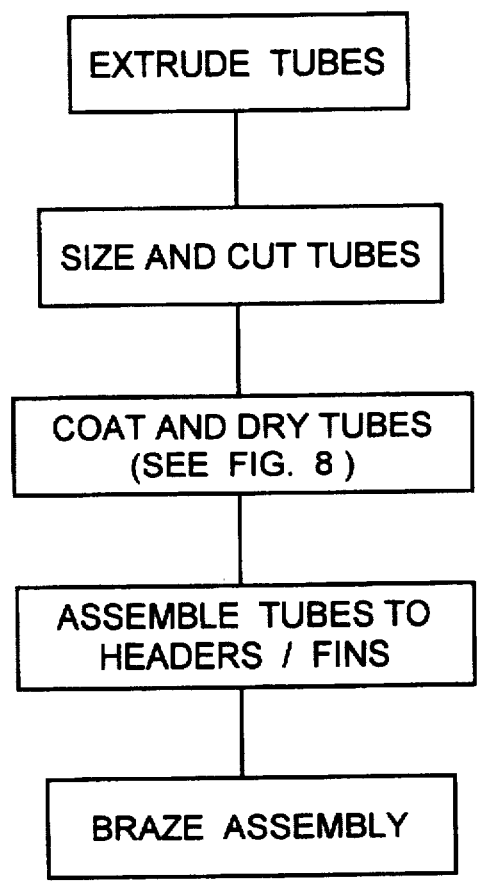

As illustrated in FIG. 7, the method of applying predetermined and controlled differential coatings to the extruded and cut to length tubes and then the immediate drying and curing of the coated tubes provides a process which eliminates the costly, time consuming steps and environmentally hazardous steps utilized in manufacturing conventional parallel flow-type heat exchangers.

Additionally, in the present invention the subsequent furnace brazing wherein the aluminum brazing alloy provides the fillet or joint about the junction between the microextruded tubes and the headers, and insures that the precise amounts of flux material and aluminum filler metal will have been pre-applied to the pieces of the assembly. Accordingly, in the subsequent furnace brazing operation, the furnace efficiency will be greater and less waste will occur because there will be no excess material on the assemblies. Also, the furnace itself will cost less because no pre-drying portion of the furnace will be required.

Importantly, in the mixing of the various coating compositions and the applying of the same to the microextruded tube and headers, the materials may be supplied in powdered or particulate form and then mixed with the binder vehicle/glue or adhesive material. This permits greater control of air-born particles than is possible in the prior art flame spraying or depositing techniques. For example, in the flame spraying of zinc, the zinc is a highly dangerous and hazardous material. Such danger is eliminated in the present disclosed method of applying the differential compositions to the microextruded tubes.

Additionally, waste materials, as a result of contamination, are eliminated and substantially reduced in the present disclosed method. In the present invention the differential coating compositions are not contaminated with lubricating oils because the need for lubricating oils has been eliminated in handling the coated tubes. Finally, the use of fit-up rods inserted within the headers to insure proper insertion depth of each end micro-tube into the headers when the micro-tube is joined to the headers of the heat exchanger assembly or special header designs providing stops for each microextruded tube has been eliminated. The prior art processes and procedures require special rods and apparatus which are inserted into the headers, processes which are very complicated, expensive and time consuming.

I claim:

1. An elongated microextruded tube having two side surfaces, front and trailing edge surfaces and two ends which are each inserted into aligned slots in headers to complete a heat exchanger assembly, wherein said tube includes a first coating composition containing an adhesive binder vehicle, flux material and brazing alloy deposited on the side surfaces adjacent each of the ends of said tube, with said first coating composition on the side surfaces structurally arranged to engage the aligned slots in the headers to align and to control the depth of insertion of each of the ends of the tubes into the headers, with each of the side surfaces of said microextruded tube having a second side surface coating containing an adhesive binder vehicle, flux material, zinc and silicon extending the length of side tube between said first coating, and with each of the front and trailing edge surfaces having a third surface coating composition containing adhesive binder vehicle, flux material and zinc.

2. The tube in accordance with claim 1, wherein each of the ends of said tube inserted into the headers is substantially free of lubricant.

3. The tube in accordance with claim 1, wherein each of the ends of said tube inserted into the headers is substantially free of any coating.

4. The tube in accordance with claim 1, wherein said first coating composition is substantially free of zinc metal.

5. The tube in accordance with claim 4, wherein said second side surface coating contains a zinc content greater than said first coating composition.

6. The tube in accordance with claim 1, wherein said microextruded tube has a length between about 6 to 30 inches, a width of between about 0.5 to 5.0 inches, and a thickness of between about 0.05 to 0.10 inches.

7. The tube in accordance with claim 6, wherein said tube contains a plurality of elongated multi-ports extending the length of the tube.

8. The tube in accordance with claim 1, wherein said first coating composition has a coating thickness of between about 0.005 to 0.010 inches when said coating has been dried and bonded to said tube.

9. The tube in accordance with claim 8, wherein said coating thickness is about 0.006 inches when said coating has been dried and bonded to said tube.

10. The tube in accordance with claim 1, wherein said adhesive binder material in said first, second and third surface coatings is a liquid cement.

11. A method of manufacturing parallel flow-type heat exchanger assemblies including the steps of:

extruding an elongated micro-tubes containing multi-ports extending the length thereto, said micro-tubes having two side surfaces and front and trailing edge surfaces;

sizing and cutting the elongated micro-tube into predetermined lengths to provide a micro-tubes having two ends;

applying differential coating compositions to the side surfaces and front and trailing surfaces of the micro-tubes and drying and bonding the deposited coatings to the micro-tubes;

inserting the ends of the dried micro-tubes into openings in the headers of the heat exchanger; and brazing the inserted micro-tubes and headers in a brazing furnace to complete the parallel flow-type heat exchanger assembly.

12. The method of manufacturing in accordance with claim 11, wherein at least one of said differential coating compositions is applied to the side surfaces of the micro-tube and controls the alignment and depth of insertion of the ends of the micro-tubes into the openings in the headers.

13. The method of manufacturing in accordance with claim 12, wherein said at least one differential coating composition includes an adhesive binder vehicle, flux material, and a brazing alloy applied on the two side surfaces adjacent each of the ends of said cut micro-tubes and structurally arranged to engage the header when the ends are inserted into the openings in the headers.

14. The method of manufacturing in accordance with claim 13 wherein the dried and bonded said at least one differential coating composition has a coating thickness of about 0.005 to 0.010 inches.

15. The method of manufacturing in accordance with claim 13, wherein said at least one differential coating composition is applied to the side surfaces adjacent to the ends of the micro-tube by ink-type transfer pad wheels.

16. The method of manufacturing in accordance with claim 11, wherein at least one of said differential coating compositions applied to the side surfaces of the micro-tubes facilitates the attachment of unclad fin stock to the micro-tube.

17. The method of manufacturing in accordance with claim 16 wherein said at least one differential coating composition includes an adhesive binder vehicle, flux material, zinc and silicon applied on the two side surfaces and extending substantially the length of the micro-tube.

18. The method of manufacturing in accordance with claim 17, wherein said at least one differential coating composition is applied to the side surfaces of the micro-tube by ink-type transfer pad wheels.

19. The method of manufacturing in accordance with claim 11, wherein at least one of said differential coating compositions is applied to the front and trailing edge surfaces.

20. The method of manufacturing in accordance with claim 19, wherein at least one differential coating composition includes an adhesive binder vehicle, flux material, and zinc applied to said surfaces and extending substantially the length of the micro-tube.

21. A method of manufacturing heat exchanger tubes for use in assembling parallel flow-type heat exchanger assemblies, including the steps of:

extruding an elongated micro-tube containing multi-ports extending the length thereto and having two side surfaces and front and trailing edge surfaces;

sizing and cutting the elongated micro-tube into predetermined lengths to provide a micro-tube with two ends;

applying differential coating compositions to the side surfaces and front and trailing surfaces of the micro-tubes; and drying and bonding the deposited coatings to the micro-tubes.

* * * * *